United States Patent
Naberhaus

(10) Patent No.: US 6,206,024 B1
(45) Date of Patent: Mar. 27, 2001

(54) VALVE ASSEMBLY

(76) Inventor: E. Paul Naberhaus, 2518 Salem St., Cincinnati, OH (US) 45208

( * ) Notice: Subject to any disclaimer, the term of this patent is extended or adjusted under 35 U.S.C. 154(b) by 0 days.

(21) Appl. No.: 09/304,782

(22) Filed: May 4, 1999

(51) Int. Cl.$^7$ .................................................. F16K 1/22
(52) U.S. Cl. .................... 137/15.24; 137/315.24; 251/113; 251/308
(58) Field of Search .................... 137/315, 315.24, 137/15.18, 15.24; 251/111, 113, 148, 304, 305, 308

(56) References Cited

U.S. PATENT DOCUMENTS

| | | | |
|---|---|---|---|
| 3,081,791 | * | 3/1963 | Wheatley ............................. 251/308 |
| 3,424,200 | | 1/1969 | Marley et al. . |
| 3,827,452 | | 8/1974 | Baumgarten . |
| 3,939,864 | * | 2/1976 | Donnelly ............................. 251/133 |
| 4,137,935 | | 2/1979 | Snowdon . |
| 4,682,758 | * | 7/1987 | Scobie et al. ......................... 251/84 |
| 4,846,441 | * | 7/1989 | Scobie et al. ......................... 251/307 |
| 5,236,003 | * | 8/1993 | Habicht ............................... 137/315 |
| 5,370,361 | * | 12/1994 | Mendell et al. ...................... 251/307 |
| 5,642,751 | | 7/1997 | Crawley . |

OTHER PUBLICATIONS

Roto–Disc Co., *New! Roto–Disc*, and six photographs of the valve assembly show therein, Jan. 25, 1985.

* cited by examiner

Primary Examiner—A. Michael Chambers
(74) Attorney, Agent, or Firm—Wood, Herron & Evans, L.L.P.

(57) ABSTRACT

An improved valve disc assembly that can be easily and conveniently disassembled and reassembled with accurate positioning of the valve disc within the through bore of the valve body. A split clamp ring is provided for securing the seat retaining ring and valve seat onto the valve body for sealing engagement with the valve disc. The shaft through which movement of the valve disc to and between open and closed positions is accomplished, also includes a detent that automatically positions the valve disc within the bore upon reassembly of the valve.

27 Claims, 3 Drawing Sheets

VALVE ASSEMBLY

BACKGROUND OF THE INVENTION

The present invention relates to valves, and, more particularly, to an improved valve system that permits relatively easy assembly, disassembly and reassembly of the valve.

A variety of valve designs and configurations are available for use for material handling requirements, particularly for industrial applications. Numerous design criteria and operational parameters are required for the valves in such industrial applications.

Such industrial disc valves can be used for food, pharmaceutical, nuclear or toxic chemical applications. As such, the valve must be compatible with a wide variety of materials, some of which may be sticky, gummy, abrasive, granular, pelletized, and/or possess other troublesome characteristics. Handling of such materials through the valve over time typically results in fouling, jamming, leakage or other problems, which in turn results in poor valve performance. Importantly, the valve must be reliable to provide smooth and efficient operation without damage to the material flowing there through when in an open or partially opened configuration.

One type of valve currently available for industrial use is referred to as a disc valve in which a movable valve member, typically in the shape of a disc, is pivotally mounted within the bore or opening in a valve body. In a fully closed configuration, the disc is in sealing contact with a peripheral portion of the bore formed in the valve body to prevent the flow of material through the valve, and in a partial or fully open configuration, the valve disc is pivoted to permit the partial or full flow of material through the valve. An actuator, which may be pneumatic, manual or otherwise, is coupled to the shaft on which the disc valve member pivots for opening and closing of the valve.

Due to the nature of many of the materials being handled by industrial disc valves, such as sticky, gummy, abrasive or similarly characterized materials, periodic cleaning of the valve is required. Such periodic maintenance generally requires removal, disassembly, and cleaning of the valve, and any other sanitization. Optimally, the downtime of the system in which the valve is utilized should be minimized to avoid an excessive and detrimental economic impact to the industrial or other production cycle and maintenance manpower costs.

In many instances, industrial disc valves utilized in food, pharmaceutical, nuclear or toxic chemical environments are operated in highly restrictive, clean room, limited access or other specialized environments. As such, operators that service such systems must wear protective clothing, uniforms, gloves, goggles and other equipment to avoid contamination of the processed materials and/or potential injury and harm to themselves. Such protective clothing, particularly gloves, render it very difficult and cumbersome to easily, efficiently and quickly assemble and disassemble industrial equipment such as a disc valve. Moreover, the improved operational performance and efficiency of the disc valve is the purpose for the maintenance in many instances in the first place, and must not be compromised upon reassembly of the components. For example, accurate positioning of the components of the disc valve relative to one another, and associated clearances or tolerances must be maintained, for optimal operation as previously described. Under such conditions, the precise reassembly of known disc valves after cleaning is difficult, as the accurate and precise manipulation of the needed tools and valve components is required.

Therefore, there is a need for an improved disc valve for industrial applications which can be easily and conveniently disassembled and reassembled, preferably without the use of hand tools even by an operator wearing protective clothing and gloves while still maintaining exacting operational parameters of the valve after that disassembly and reassembly.

SUMMARY OF THE INVENTION

These and other objectives of the invention have been attained by an improved valve assembly which is capable of being entirely disassembled and reassembled manually without the benefit of tools or other potentially cumbersome and difficult to manipulate instruments. Moreover, upon reassembly of the disc valve of this invention, the disc valve member is automatically centered relative to a bore in the valve body, thereby providing proper clearance and tolerance for reliable and consistent operation of the valve upon reinstallation into the material handling system.

In a presently preferred embodiment, the valve assembly according to this invention includes a valve member in the form of a dome-shaped disc having a pair of projecting valve arms. The disc is housed within the bore of a valve body, and is mounted for pivotal movement therein on a pair of respective shafts coupled to the valve arms. The shafts are seated within holes in the valve body for rotational movement, and one of the shafts is coupled to an actuator for selective rotation of the shafts and, thereby, pivotal movement of the disc within the valve body to and between closed and opened positions.

Each shaft preferably includes a spline portion located adjacent to an annular recess on the shaft. A shoulder or detent borders the annular recess. Each valve arm includes a spline hole to receive therein the spline portion of one of the shafts for releasably coupling the valve arms to the respective shafts and, thereby, transmitting the rotation of the shaft to pivot the disc within the valve body. Importantly, the shoulder or detent adjacent to the annular recess on each of the shafts engages or abuts against the valve arm for accurately and precisely positioning the disc relative to the valve body and bore. As such, upon reassembly of the valve the disc is automatically and accurately positioned relative to the valve body without adjustment or calibration by the user.

Each shaft is preferably secured to the valve body by a shaft retainer plate. The shaft retainer plate is secured to the valve body by a plurality of bolts and thumb screws for easy manual installation and removal of the shaft retainer plates without the benefit of hand tools.

Another important feature of the present invention in a preferred embodiment is the ease and expertise with which each of the components of the valve assembly can be securely assembled together. A valve seat is releasably coupled to the valve body in sealing engagement with the disc valve in a closed position to thereby effectively and reliably prevent the flow of material through the valve. The valve seat is sandwiched between a portion of the valve body and a seat retaining ring. The seat retaining ring and valve seat are securely clamped to the valve body during assembly and reassembly by a clamp ring which includes a pair of semicircular members pivotally coupled together. When the clamp ring is installed onto the valve body and seat retaining ring, it surrounds a perimeter of the seat retaining ring and a portion of the valve body, thereby clamping the two members together with the valve seat there between. The clamp includes a manually operable latch for easy and convenient manipulation and operation during disassembly and reassembly of the valve. The clamping force produced by the clamp of this invention is at least as good as prior designs while offering significantly easier operation and use.

Accordingly, the present invention, including the valve assembly itself and the method of assembly, disassembly and use of the valve assemblies, solves the above-described disadvantages of known prior art disc valves by providing a sturdy, reliable and effective disc valve for industrial applications which can be easily and quickly assembled and disassembled, even by a user wearing a protective suit and gloves, in a timely and efficient manner. Moreover, the required clearances or tolerances of the disc valve member within the valve body are accurately and automatically achieved upon reassembly to provide for effective closure and precise opening of the valve as required during operation.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
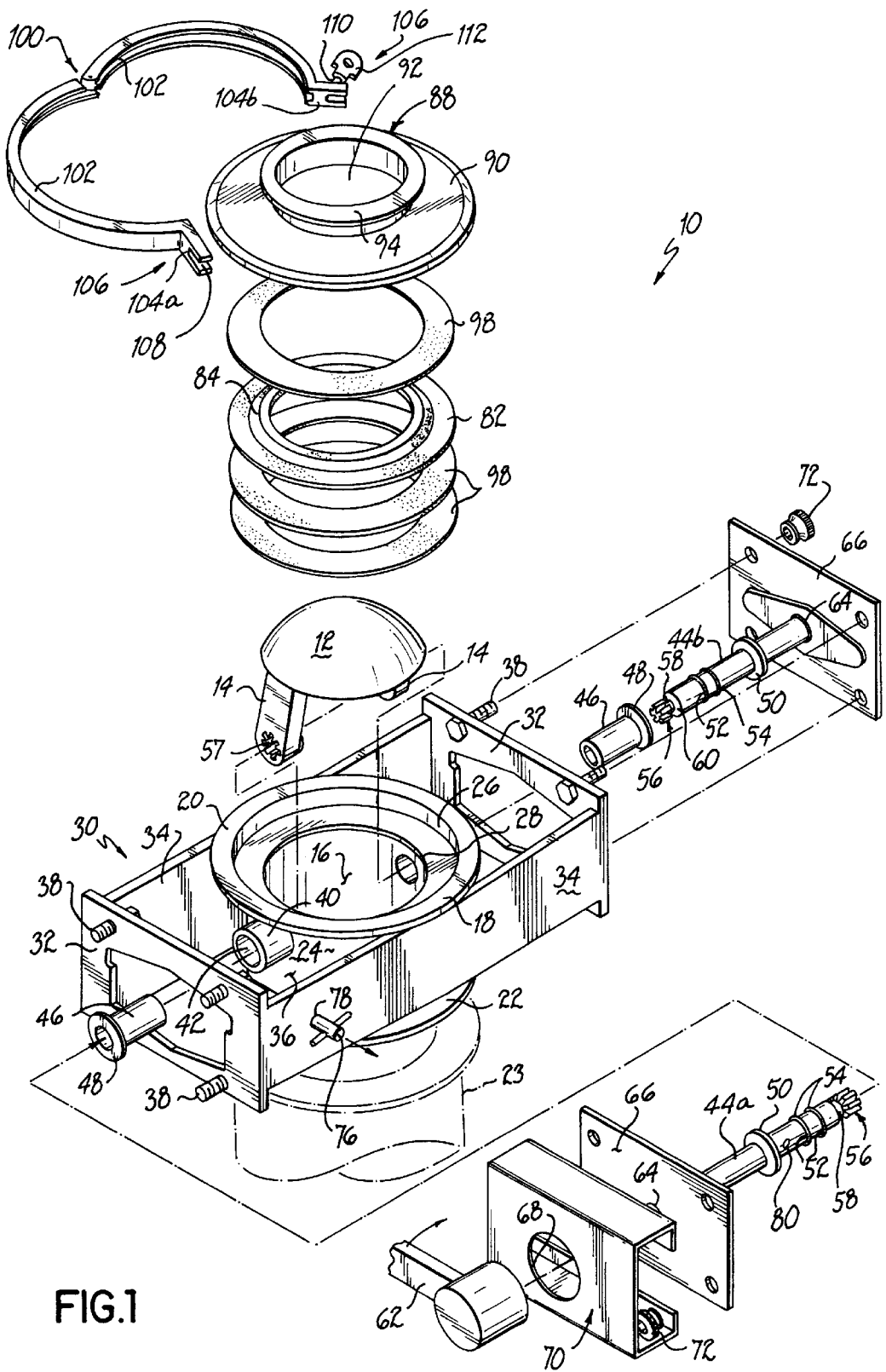
FIG. 1 is an exploded perspective view of the components of a presently preferred embodiment of a valve assembly according to this invention.
Figure 2:
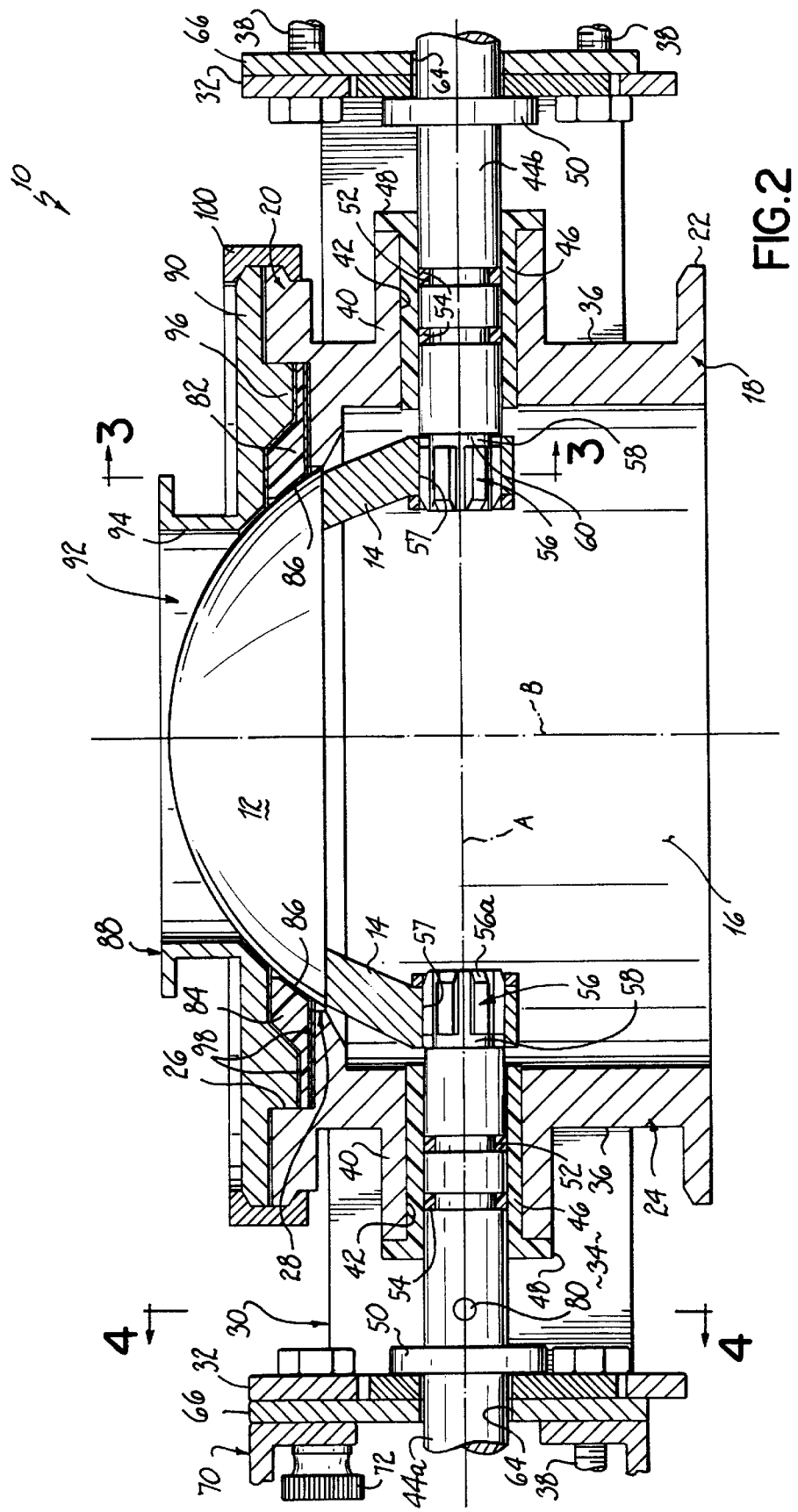
FIG. 2 is a cross-sectional side elevational view of an assembled valve of the valve components shown in FIG. 1.
Figure 5:
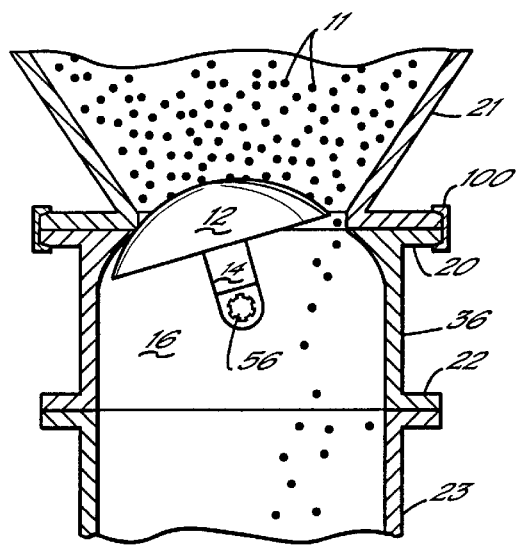
FIG. 5 is a schematic representation of the valve assembly in a partially open configuration.
Figure 6:
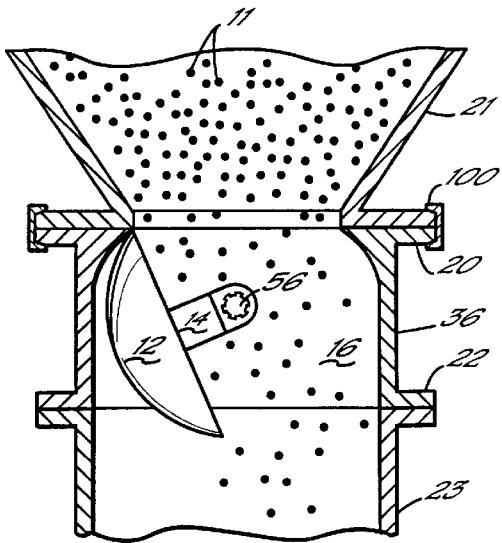
FIG. 6 is a view similar to FIG. 5 with the valve assembly in a fully open configuration.

A presently preferred embodiment of the valve assembly according to this invention is shown in FIG. 1. The valve assembly 10 includes a valve member 12 in the shape of a dome-shaped valve disc having a pair of valve arms 14 depending downwardly therefrom. The valve member 12 preferably may be 316 stainless steel, and is pivotally mounted within a through bore 16 in a valve body 18 which also preferably may be 316 stainless steel. The valve body 18 includes upper and lower flanges 20, 22 formed at the upper and lower ends, respectively, of a cylindrical portion 24 of the valve body 18. The lower flange 22 which may be configured for ANSI or other industry convention compatibility for mating with upstream components 21 and downstream components 23. The upper flange is preferably configured as described below. An annular channel 26 is formed between the upper flange 20 and a lip 28 projecting inwardly toward the valve bore 16. The lip 28 includes a lower beveled or tapered surface which is contoured to conform with the dome-shaped valve disc 12 to allow for the movement to and between closed and open positions of the valve disc 12. The closed position of the valve assembly 10 is shown in FIG. 2 and partially and fully open positions of the valve assembly 10 are shown in FIGS. 5 and 6, respectively.

The valve body 18 also includes a peripheral frame 30 including oppositely spaced mounting plates 32 (which preferably may be of 316 stainless steel) which are welded or otherwise attached to the corresponding opposite ends of a pair of bowed valve body plates 34 (which also preferably may be of 316 stainless steel). The central regions of the valve body plates 34 are welded or otherwise attached to the exterior of the side wall 36 of the valve body's cylindrical portion 24 between the upper and lower flanges 20, 22. A number, preferably four, of threaded bolts 38 project through each mounting plate 32 as shown in FIG. 1, and are welded or otherwise secured thereto.

Diametrically opposed collars 40 are mounted on a transverse axis A of the valve assembly 10 to the side wall 36 of the cylindrical portion 24 of the valve body 18. Each collar 40 surrounds an aperture 42 through which one of two shafts 44 (each preferably may be 316 stainless steel) is inserted. Each shaft 44 projects through one of the collars 40 and a tubular bushing 46, with a circular disc-shaped flange 48 projecting from one end thereof, surrounds the shaft 44. The tubular portion of the bushing 46 is inserted within the aperture 42 of the collar 40. The bushing 46 preferably may be glass-filled Teflon, or alternatively brass, stainless steel or another appropriate material. When assembled, as shown in FIG. 2, the disc-shaped flange 48 of the bushing 46 is sandwiched between the outer edge of the collar 40 and an annular shaft retaining brace 50 fixed to the shaft 44.

Each shaft 44 also preferably may include one or a pair of spaced annular groves 52 into which are seated one or a pair of O-rings 54, which preferably may be made of Viton. When the shaft 44 is inserted through the respective bushing 46 seated in the collar 40, the O-rings 54 provide a vacuum or partial vacuum sealing engagement with the bushing 46 so as to permit vacuum or similar operation of the valve assembly 10. A spline portion 56 is formed at a terminal or distal end of each shaft 44, and is received in a mating spline hole 57 in the associated valve arm 14. An annular recess 58 is formed in each shaft 44 adjacent to the spline portion 56. The annular recess 58 is bordered by a shoulder or detent 60 at the opposite end of the annular recess 58 from the spline portion 56.

One of the shafts 44 of the valve assembly 10 in the presently preferred embodiment is a drive shaft 44a that is coupled to an actuator 62 which may be in the form of a handle as shown in FIG. 1, or any other appropriate actuator such as a pneumatic or otherwise driven device appropriate for the particular process system or application requirements. A proximal end of the drive shaft 44a is coupled to the actuator 62 through an appropriately configured opening 64 in a shaft retaining plate 66 and an opening 68 in a generally C-shaped actuator bracket 70 (which preferably may be 304 stainless steel). The bracket 70 and shaft retaining plate 66 are manually and releasably mounted to the mounting plate 32 of the valve body 18 by thumb screws, wing nuts or other manually operable fasteners 72 (preferably may be 18-8 stainless steel) threadably mounted onto the threaded shaft of the bolts 38 projecting from the mounting plate 32. The opposite shaft 44 is aligned with the drive shaft 44a on the transverse axis A, and constitutes an idler shaft 44b which is likewise secured to the valve assembly 10 by a shaft retaining plate 66, thumb screws, wing nuts or other appropriate manually operable fasteners 72 on the threaded portions of the bolts 38 projecting from the associated mounting plate 32. The shaft retaining brace 50 on each of the shafts 44 abuts against the associated shaft retaining plate 66 when installed on the mounting plate 32 to thereby accurately position the shaft 44 along the transverse axis A when the valve 10 is assembled.

It should be readily appreciated that rotational movement of the handle or other appropriate actuator 62 transmitted through the drive shaft 44a coupled to the valve disc member 12 via the spline portion 56 and spline hole 57, and similarly the idler shaft 44b, pivotally moves the valve disc member 12 within the bore 16 to and between open and closed positions.

Figure 4:
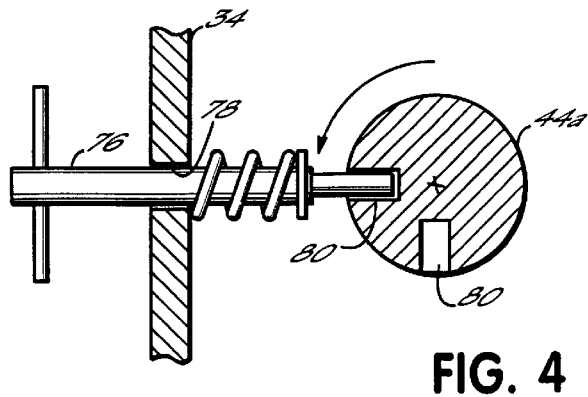
FIG. 4 is a schematic representation of a locking pin engaged with a drive shaft according to the invention.

As shown particularly in FIGS. 1 and 4, a preferably spring biased safety locking pin 76 is preferably inserted through a hole 78 in one of the valve body plates 34 which is aligned with a hole or multiple circumferentially spaced holes 80 in the drive shaft 44a to thereby prevent rotation of the shaft 44a and pivotal movement of the valve disc 12 when the locking pin 76 is inserted. Advantageously, insertion of the locking pin 76 will fix the location of the valve disc 12 within the bore 16 in a closed, open or partially open configuration as required depending upon the position of the hole 80 in the shaft 44a. The valve disc 12 is typically relatively heavy and could potentially cause injury to a human finger or the like in its path, so the locking pin 76 is helpful as a safety precaution to prevent potential injury to an operator during servicing, disassembly or re-assembly of the valve 10.

An annular valve seat 82, preferably made of glass-filled Teflon, is seated within the channel 26 of the valve body 18. The valve seat 82 includes a raised sill 84 surrounding the inner portion thereof. A tapered or beveled edge 86 adjacent to the lower surface of the valve seat 82, and surrounding the inner circumference thereof, is pressed into sealing engagement with the dome surface of the valve disc 12 when the valve disc 12 is in a closed or partially closed configuration. A seat retaining ring 88 (which preferably may be 316 stainless steel) in one presently preferred embodiment includes a base 90 and a central circular opening 92 defined by an upwardly extending generally L-shaped annular flange 94 welded or otherwise secured to the inner circumference of the opening 92 in the base 90. The outer dimensions of the base 90 are the same as those of the outer periphery of the upper flange 20 of the cylindrical portion 24 of the valve body 18. A downwardly projecting annular extension 96 is formed on the bottom surface of the base 90 of the seat retaining ring 88. The extension 96 is sized and configured to seat within the channel 26 formed in the cylindrical portion 24 of the valve body 18 in relation to the generally planar upper portion of the valve seat 82, as shown in FIG. 2.

A number of shims 98 (which preferably may be of virgin Teflon), three of which are shown in FIG. 1, are provided with the valve assembly 10 according to the presently preferred embodiment of this invention. The shims 98 are selectively positioned above and/or below the valve seat 82 to accurately position the valve seat 82 into sealing engagement with the valve disc 12 in order to provide an effective and positive seal there between depending on the specific geometry, tolerances, and clearances which may result from operational wear or manufacturing practices. The shims 98 will raise or lower the valve seat 82 relative to the valve disc 12 as appropriate for the desired clearances, tolerances or other relationships.

Advantageously, the seat retaining ring 88, valve seat 82 and associated shims 98 are easily, quickly and securely clamped to the valve body 18 during assembly and reassembly, and are easily removed therefrom during disassembly of the valve 10, as allowed for by a clamp 100 in the form of a clamp ring having two semicircular members 102 pivotally coupled together at adjacent ends thereof. Each semicircular clamp member 102 has a generally C-shaped cross-sectional configuration so that when the clamp ring 100 is positioned around the perimeter of the seat retaining ring 88 and the outer circumference of the upper flange 20 of the valve body 18 with the valve seat 82 and shims 98 there between, the perimeter edge of the seat retaining ring 88 and of the upper flange 20 are captured within the clamp ring 100. The distal ends of each member 102 of the clamp ring 100 include a bifurcated stem 104 which cooperate together to form a latch 106 for releasably securing the clamp ring 100 onto the valve body 18 and seat retaining ring 88. The bifurcated stem 104a of one of the clamp ring members 102 includes a seat or a recess 108 to receive therein the cooperating portion of the latch 106 on the other bifurcated stem 104b. The cooperating portion of the latch 106 includes a threaded rod 110 pivotally coupled between the bifurcated arms of the stem 104b with a manually operable lug 112 threadably mounted on the rod 110.

As such, with the clamp ring members 102 pivoted toward each other around the perimeter of the seat retaining ring 88 and the upper flange 20 of the valve body 18, the threaded rod 110 of the latch 106 is pivoted toward and between the arms of the bifurcated stem 104a on the opposite clamp member 102. The lug 112 is rotated in a first direction to close the latch 106 and securely tighten the clamp 100, and in a second opposite direction to loosen the clamp 100 for removal and disassembly of the valve. Therefore, access to the valve disc 12, valve seat 82, seat retaining ring 88, and subsequent disassembly of the valve 10 can be easily accomplished manually without hand tools by an operator even when wearing a protective suit and/or gloves.

Figure 3:
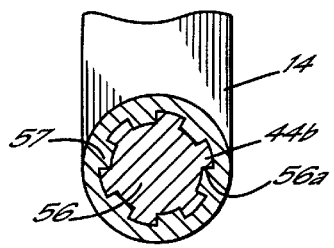
FIG. 3 is a cross-sectional view taken along line 3—3 of FIG. 2 showing the interaction of a spline portion of one of the shafts of the valve assembly with an arm connected to the disc valve member.

Referring specifically to FIGS. 2 and 3, during assembly of the valve 10, the spline portions 56 of each shaft 44 are inserted through the associated collar 40 in the valve body 18 with the bushing 46 seated therein until they project into the bore 16 of the valve body 18. The spline portions 56 are received within the spline openings 57 in the respective valve arms 14 of the valve disc 12 which has been appropriately pre-positioned in the valve body 18. The position of the valve disc 12 is automatically centered relative to the longitudinal axis B of the valve assembly 10 once the spline portions 56 of each of the shafts 44 are inserted into the respective valve arms 14 because the shoulder detent 60 bordering the annular recess 58 on each shaft 44 contacts, engages or otherwise abuts against the confronting surface of the respective valve arm 14 as specifically shown in FIGS. 2 and 3. The protruding elements or keys 56a of the spline portion 56 of each shaft 44 contact the confronting surface of the valve arm 14, thereby limiting the lateral movement of the valve disc 12 along the transverse axis A. As such, the valve member or valve disc 12 is accurately centered and positioned for sealing engagement when in a closed or partially closed configuration with respect to the valve seat 82. The position of the shafts 44 within the collars 40 and relative to the valve body 18 is accurately maintained with the respective shaft retaining plates 66 contacting the outer surface of the associated shaft retaining brace 50, as shown particularly in FIG. 2. Therefore, lateral movement of the shafts 44 and the valve disc 12 is limited, and the valve disc 12 is accurately and reliably positioned in the valve body 18 when the valve 10 is assembled without further adjustment, modification or attention by the user.

From the above disclosure of the general principles of the present invention, and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A method for assembling a valve assembly comprising the steps of:

inserting a valve member within a bore of a valve body;

inserting first and second shafts through first and second holes, respectively, in the valve body;

releasably coupling the first and second shafts with the valve member;

engaging a fixed detent on at least one of the shafts with the valve member thereby to center the valve member within the bore;

mounting at least one shaft retainer to the valve body thereby to releasably secure the shafts to the valve body; and attaching an actuator to one of the shafts to permit selective rotation of the shaft for pivoting the valve member between closed and open positions in the valve body.

2. The method of claim 1 further comprising:

inserting a spline portion on each shaft into a spline hole in a corresponding portion of the valve member thereby to couple the shafts to the valve member.

3. The method of claim 2 further comprising:

abutting a shoulder bounding a recess adjacent to the spline portion on each shaft against the valve member to thereby center the valve member within the bore.

4. The method of claim 1 further comprising:

positioning a valve seat relative to the valve body and in sealing engagement with the valve member when in the closed position; and manually installing a clamp on the valve body to secure the valve seat to the valve body.

5. The method of claim 4 wherein the manually installing of the clamp further comprises:

positioning a seat retainer atop the valve seat;

surrounding a perimeter edge of the seat retainer and a portion of the valve body with a pivotally split clamp ring; and manually latching together free ends of the clamp ring thereby to releasably clamp the valve seat and the seat retainer onto the valve body.

6. The method of claim 1 wherein the mounting of the shaft retainer onto the valve body is accomplished manually.

7. The method of claim 1 wherein the method is accomplished manually without the benefit of hand tools.

8. The method of claim 1 further comprising:

selectively locking one of the first and second shafts relative to the valve body thereby to prevent rotation of same and pivotal movement of the valve member within the bore.

9. A method for assembling a valve assembly comprising the steps of:

inserting a valve member within a bore of a valve body;

inserting first and second shafts through first and second holes, respectively, in the valve body;

releasably coupling the first and second shafts to the valve member;

engaging a fixed detent on at least one of the shafts with the valve member thereby to center the valve member within the bore;

mounting at least one shaft retainer to the valve body thereby to releasably secure the shafts to the valve body;

attaching an actuator to one of the shafts to permit selective rotation of the shaft for pivoting the valve member between closed and open positions in the valve body;

positioning a valve seat relative to the valve body and in sealing engagement with the valve member when in the closed position; and manually installing a clamp on the valve body to secure the valve seat to the valve body.

10. The method of claim 9 wherein the manually installing of the clamp further comprises:

positioning a seat retainer atop the valve seat;

surrounding a perimeter edge of the seat retainer and a portion of the valve body with a pivotally split clamp ring; and manually latching together free ends of the clamp ring thereby to releasably clamp the valve seat and the seat retainer onto the valve body.

11. The method of claim 9 wherein the mounting of the shaft retainer onto the valve body is accomplished manually.

12. The method of claim 9 further comprising:

manually increasing a clamping force delivered by the clamp on the valve body and valve seat.

13. A valve assembly comprising:

a valve body having a bore there through;

a valve member removably and pivotally mounted within the valve body for selectively closing and opening the bore in the valve body;

a first and a second valve arm each connected to and extending from the valve member;

a first and a second shaft each projecting through the valve body and being mounted for rotation relative to the valve body, the first and second shafts being releasably coupled to the first and second valve arms, respectively;

a fixed detent on at least one of the shafts engaging the respective valve arm for centering the valve member relative to the bore; and an actuator coupled to one of the shafts to selectively rotate the shafts relative to the valve body and to pivot the valve member within the valve body, for opening and closing the valve;

whereby upon disassembly and re-assembly of the valve assembly the valve member is automatically centered relative to the bore by the engagement of the fixed detent on the shaft with the valve arm.

14. The valve assembly of claim 13 wherein each of the shafts include a fixed detent to engage the respective valve arm for centering the valve member relative to the bore.

15. The valve assembly of claim 14 wherein the fixed detent on each of the shafts comprises a shoulder bordering a recess on the shaft.

16. The valve assembly of claim 15 wherein the recess is an annular recess, the valve assembly further comprising:

a spline portion on each of the shafts adjacent to the annular recess; and a spline hole in each of the valve arms to receive therein the spline portion of one of the shafts to releasably couple each of the valve arms to the respective shaft, and to transmit the rotation of the shaft to pivot the valve member within the valve body.

17. The valve assembly of claim 16 wherein the valve member is dome shaped and the valve arms are connected thereto at diametrically opposite positions.

18. The valve assembly of claim 13 further comprising:

a valve seat releasably coupled to the valve body and in sealing engagement with the valve member in a closed position.

19. The valve assembly of claim 18 further comprising:

a seat retaining ring; and a clamp for selectively securing the valve seat between the seat retaining ring and the valve body.

20. The valve assembly of claim 19 wherein the clamp further comprises:

a pair of semi-circular members pivotally coupled together at a first end of each semi-circular member; and a pair of cooperating latch members located at a second end of each semi-circular member to releasably secure the clamp to a perimeter of the seat retaining ring and a portion of the valve body with the valve seat there between and to sealingly engage with the valve member in the closed position.

21. The valve assembly of claim 20 wherein the latch is manually operable.

22. The valve assembly of claim 13 further comprising:

a shaft retainer releasably mounted to the valve body; and at least one manually operable fastener releasably securing the shaft retainer to the valve body;

wherein the valve assembly can be completely manually disassembled and re-assembled with automatic centering of the valve member within the bore upon re-assembly.

23. The valve assembly of claim 13 further comprising:

a locking member selectively projecting through a portion of the valve body to engage at least one of the shafts and, thereby, to inhibit rotation of the shaft and, as a result, pivotal movement of the valve member within the bore.

24. A valve assembly comprising:

a valve body having a bore there through;

a valve member removably and pivotally mounted within the valve body for selectively closing and opening the bore in the valve body;

a first and a second valve arm each connected to and extending from the valve member;

a first and a second shaft each projecting through the valve body and being mounted for rotation relative to the valve body, the first and second shafts being releasably coupled to the first and second valve arms, respectively;

a fixed detent on at least one of the shafts engaging the respective valve arm for centering the valve member relative to the bore;

an actuator coupled to one of the shafts to selectively rotate the shafts relative to the valve body, and to pivot the valve member within the valve body, for opening and closing the valve;

a valve seat releasably coupled to the valve body, and in sealing engagement when the valve member is in a closed position;

a seat retaining ring; and a clamp for selectively securing the valve seat between the seat retaining ring and the valve body.

25. The valve assembly of claim 24 wherein the clamp further comprises:

a pair of semi-circular members pivotally coupled together at a first end of each semi-circular member; and a pair of cooperating latch members located at a second end of each semi-circular member to releasably secure the clamp to a perimeter of the seat retaining ring and a portion of the valve body with the valve seat therebetween and to sealingly engage with the valve member in the closed position.

26. The valve assembly of claim 25 wherein the latch is manually operable.

27. The valve assembly of claim 26 further comprising:

a shaft retainer releasably mounted to the valve body; and at least one manually operable fastener releasably securing the shaft retainer to the valve body;

wherein the valve assembly can be completely manually disassembled and re-assembled with automatic centering of the valve member within the bore upon re-assembly.

* * * * *